United States Patent [19]
Shuey

[11] Patent Number: 5,835,331
[45] Date of Patent: Nov. 10, 1998

[54] HALF-WAVE DRIVE CIRCUIT FOR METER DISCONNECT SWITCH

[75] Inventor: Kenneth C. Shuey, Raleigh, N.C.

[73] Assignee: ABB Power T&D Company Inc., Raleigh, N.C.

[21] Appl. No.: 984,204

[22] Filed: Dec. 3, 1997

[51] Int. Cl.⁶ .................................................. H01H 47/26
[52] U.S. Cl. .......................... 361/205; 361/170; 361/157; 361/189; 307/116; 307/130; 307/131
[58] Field of Search ..................................... 361/157, 158, 361/170, 189, 205, 139, 160, 190; 346/37; 307/116, 130, 131

[56] References Cited

U.S. PATENT DOCUMENTS

| | | | |
|---|---|---|---|
| 3,610,957 | 10/1971 | Hiscox | 307/233 |
| 4,630,166 | 12/1986 | D'Onofrio | 361/205 |
| 4,694,206 | 9/1987 | Weinberg | 307/571 |
| 4,977,482 | 12/1990 | Langdon et al. | 361/366 |
| 5,045,969 | 9/1991 | Menasco | 361/364 |
| 5,486,972 | 1/1996 | Taylor | 361/154 |
| 5,537,029 | 7/1996 | Hemminger et al. | 324/142 |
| 5,544,089 | 8/1996 | Hemminger et al. | 364/492 |
| 5,548,527 | 8/1996 | Hemminger et al. | 364/492 |
| 5,555,508 | 9/1996 | Munday et al. | 364/492 |
| 5,621,629 | 4/1997 | Hemminger et al. | 363/56 |
| 5,631,843 | 5/1997 | Munday et al. | 364/492 |

*Primary Examiner*—Jeffrey A. Gaffin
*Assistant Examiner*—Kim N. Huynh
*Attorney, Agent, or Firm*—Woodcock Washburn Kurtz Mackiewicz & Norris LLP

[57] ABSTRACT

A very low cost method of driving the coil of a meter disconnect switch utilizes the 60 Hz signals from an existing power supply rectifier to generate properly phased gate drive signals to SCRS, with only one stage of isolation.

25 Claims, 3 Drawing Sheets

5,835,331

HALF-WAVE DRIVE CIRCUIT FOR METER DISCONNECT SWITCH

FIELD OF THE INVENTION

The present invention generally relates to the field of electric power metering, and more particularly relates to circuitry and methods for driving a meter disconnect switch.

BACKGROUND OF THE INVENTION

Electrical power is supplied to an individual site or service by external power line conductors that, in a conventional arrangement, are connected to a watthour meter, which in turn measures the electric load or power used at the site or service. The electric power is delivered to the individual site through the meter. In the past, when a utility company wanted to disconnect electric service at the site, the typical practice was to remove the meter and to cover the opening in the meter socket with a blank cover plate. More recently, it has been known to use a power disconnect switch between the meter and the meter socket. The disconnect switch enables a utility company to disconnect power to an individual service site without first removing the meter. For example, the disconnect switch may be actuated by a solenoid, sealed within the meter housing, and manually activated by inserting a key and turning the key in the appropriate direction to open or close the switch. (For further information about this type of system, see U.S. Pat. No. 5,045,969, Sep. 3, 1991, "Keyed Disconnect of Electric Service at an Electric Meter Location.") This arrangement has the disadvantage of requiring a utility serviceperson to travel to the specific site to manually disconnect the electric service.

Electrical metering of residential energy has historically been accomplished with devices that sense the electromagnetic fields in proximity to voltage coils and current carrying conductors. These electromechanical meters have been low cost and effective, but have not provided additional functions that are being requested from today's systems. Communication modules as well as electronic registers have been added to electromechanical meters in attempts to provide more functionality. However, the basic electromechanical meter platform is limiting as to the amount of design integration that can be achieved with add-on electronics.

Solid State Meters

Solid state meters are available in the market but, historically, these devices have not achieved the desired low cost because they are built on platforms for more expensive polyphase meters that provide enhanced functions and command relatively high prices in the market. Residential meters are viewed as a commodity item and must achieve a very low cost target even if advanced functions are provided within the meter.

FIG. 1 depicts a typical system for electronically driving a disconnect switch coil, denoted "K" (the switch itself is not shown). Disconnect switch drive requirements typically require DC current, and significant storage components must be utilized to deliver the high energy pulses required for operation. It is not uncommon for the required capacitance to exceed tens of thousands of microfarads ($\mu$F) to source the current drive during the close and trip times. Given the size of the components required for DC coil operation, the preferred drive solution is to use a half-wave AC coil fed from the 240 volt AC line (L1, L2). Normally, a drive circuit to accomplish this function utilizes a triac 10 (two SCRs connected in anti-parallel on a single chip) and resistors (R1, R2) with a relatively simple drive scheme, as shown in FIG. 1. A drive circuit for this system would be required to send a pulse to the gate of the triac during the appropriate half-cycles. For example, to close the disconnect switch, the gate would be driven during the positive half-cycles of the line voltage, and, to open the switch, the gate would be driven during the negative half-cycles.

Unfortunately, the triac 10 has reduced noise immunity characteristics and is not the desired solution for a robust residential meter environment where incorrect disconnect switch operations could be catastrophic. SCRs are significantly less responsive to voltage transients and are the coil drive means of choice for a failsafe device, but they require isolated drive circuits since each of the anti-parallel SCRs have their gate to cathode referenced to a different side of the line.

Accordingly, there is a need for an improved circuit and method for driving a disconnect switch of a solid state meter that employs SCRs or like noise-immune devices to drive a switch coil.

SUMMARY OF THE INVENTION

A presently preferred embodiment of a circuit in accordance with the present invention for driving a coil of a disconnect switch of a solid state meter comprises first and second SCRs coupled to a switch coil for the disconnect switch such that the disconnect switch is closed when the first SCR is driven to an on state while the second SCR is off, and the disconnect switch is tripped when the second SCR is driven to an on state while the first SCR is off; a first drive circuit operatively coupled to the first SCR; and a second drive circuit operatively coupled to the second SCR. According to the invention, the first and second drive circuits are powered with half-wave voltage derived from an AC line coupled to the meter.

The inventive circuit will preferably also include a power supply transformer coupled to the first and second drive circuits such that the circuits are powered by a secondary winding of the power supply transformer. In addition, the drive circuits may each further comprise a drive transformer having a primary winding operatively coupled to the secondary winding of the power supply transformer, and a secondary winding operatively coupled to the SCRs. The drive circuits may also each comprise a transistor coupled to the primary winding of the drive transformer, where the transistor includes a terminal for receiving a close or trip signal, respectively, to cause the transistor to switch to a state that will cause the first or second SCR to turn on or off, respectively.

Another aspect of the present invention provides a half-wave drive circuit utilizing 60 Hz signals that pre-exist within a solid state meter to drive a meter disconnect switch. Such a circuit comprises, in a preferred embodiment, first and second SCRs operatively coupled to a disconnect switch; a first drive circuit operatively coupled to the first SCR and a second drive circuit operatively coupled to the second SCR; and a power supply transformer coupled to the first and second drive circuits such that the circuits are powered by a secondary winding of the power supply transformer.

Yet another aspect of the present invention provides a switch control system for use in an electronic meter, comprising a power supply, an electronically actuated switch, and switch drive means coupled between the power supply and the switch for closing the switch in response to a close signal and opening the switch in response to a trip signal.

The switch drives means comprises electronic circuitry that is powered with signals that pre-exist within the solid state meter; comprises only a single stage of isolation between the power supply and the switch; and prevents surges from causing unwanted open or close operations.

Thus, as will be apparent from the following detailed disclosure, the present invention provides the following features:

(1) a low cost circuit for driving the coil of a solid state meter disconnect switch with half-wave voltage derived from the AC line;

(2) a low cost half-wave drive circuit utilizing 60 Hz signals that pre-exist within the solid state meter;

(3) a low cost drive circuit that only requires a single stage of isolation; and (4) a disconnect coil driver circuit that prevents surges from causing unwanted open or close operations.

Other features of the present invention are also disclosed below.

BRIEF DESCRIPTION OF THE DRAWINGS

FIG. 2 is a simplified diagram, and FIG. 3 is a more detailed diagram.

FIG. 4 shows a modification in which the disconnect switch is actuated (i.e., the switch coil is driven) only during zero crossings of the power supply voltages at "x" and "y", and FIG. 5 shows a voltage snubber added across the SCRs.

DETAILED DESCRIPTION OF PREFERRED EMBODIMENT

This specification describes a presently preferred embodiment of a circuit that may be added to an existing solid state meter design that incorporates communications and metering into one manufacturable package. The inventive design provides an optimal configuration for switch control with minimal stages of isolation, energy storage requirements, chance of unwanted operations, and component count.

Structure

Figure 1:
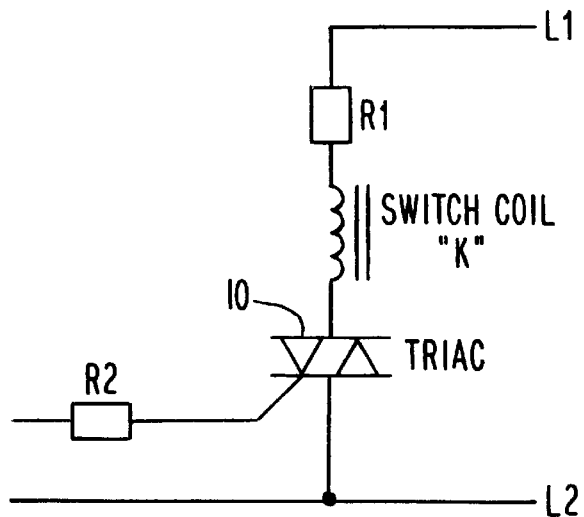
FIG. 1 schematically depicts a prior art scheme for driving a meter disconnect switch.
Figure 2:
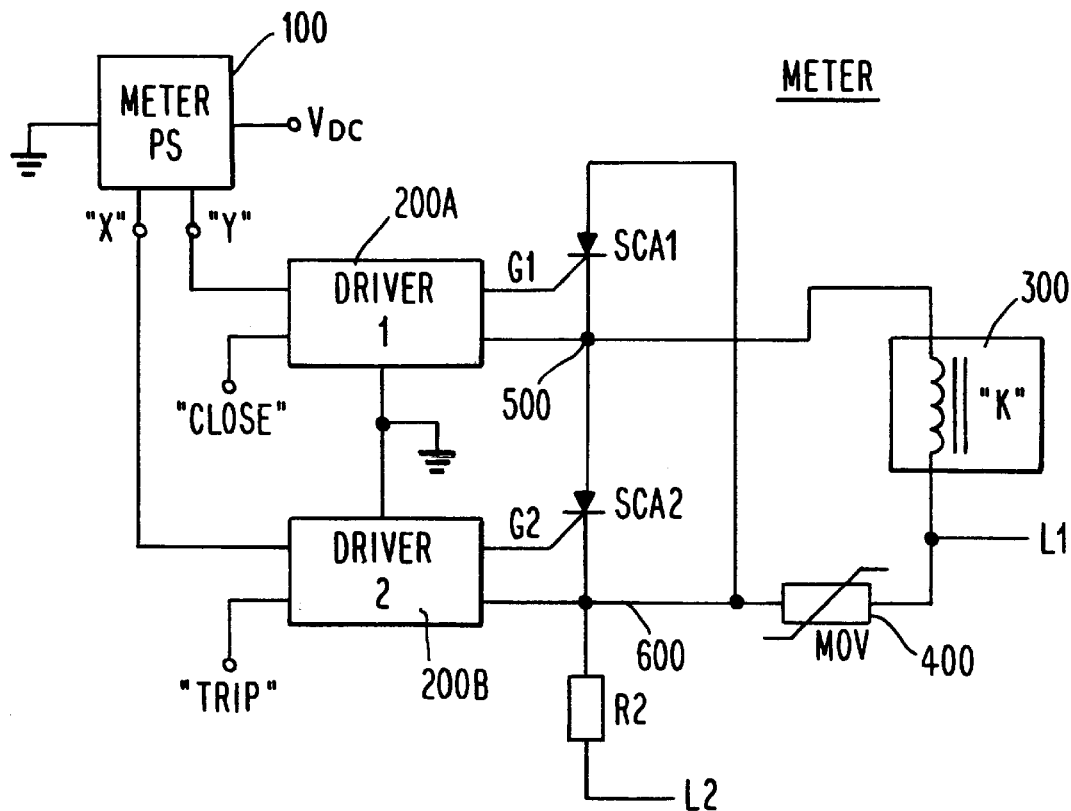
FIG. 2 and 3 schematically depict one preferred embodiment of a half-wave drive circuit in accordance with the present invention.
Figure 3:
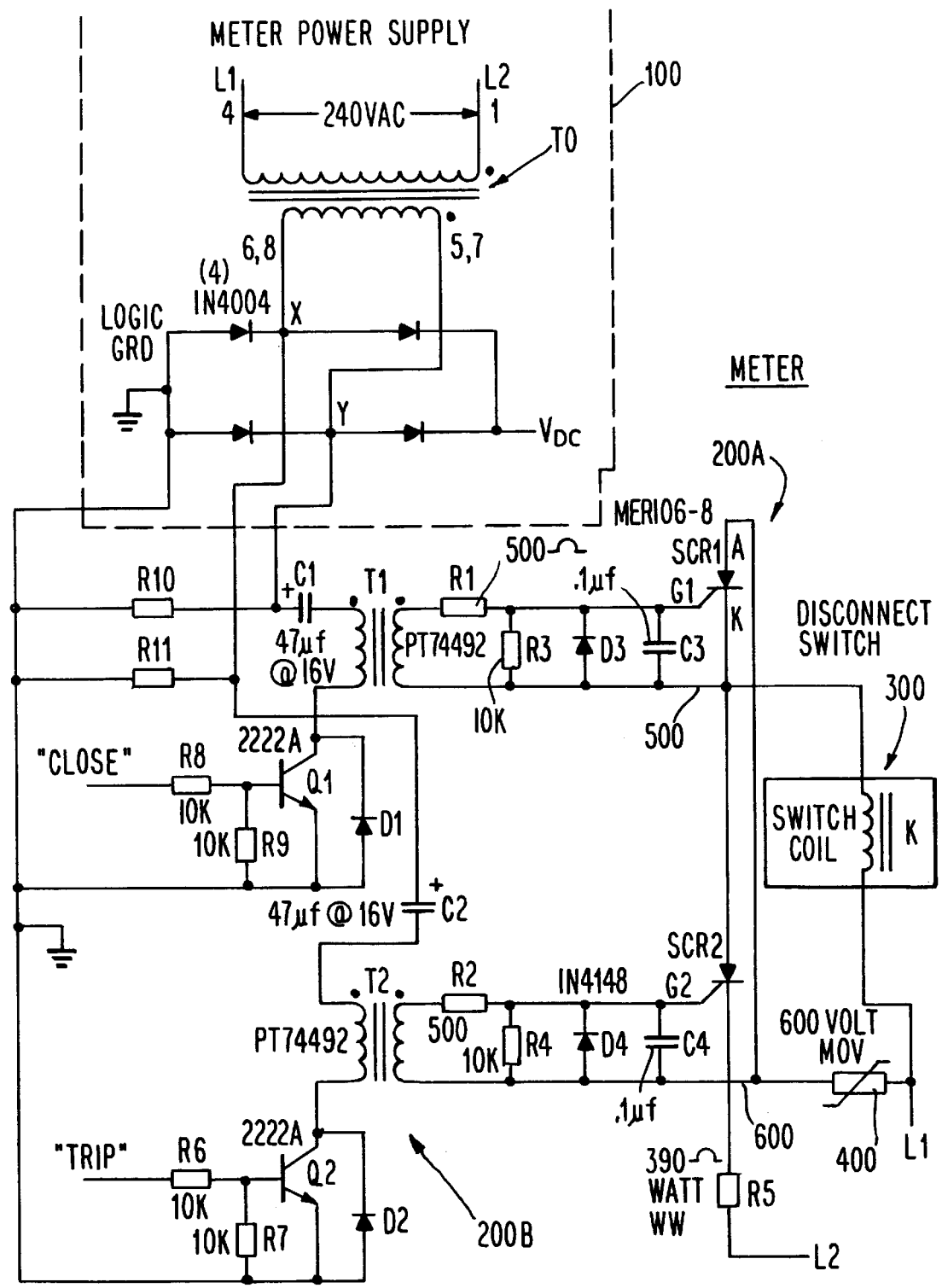

FIG. 2 is a simplified schematic diagram of the driver circuit, and FIG. 3 is a more detailed diagram. As shown, the driver circuit includes a meter power supply 100; a first drive circuit 200A and a second drive circuit 200B; first and second SCRs, denoted SCR1 and SCR2, respectively; and a disconnect switch 300. An MOV 400 and circuit nodes 500 and 600 are also shown in FIG. 2, while other particulars of the circuitry are depicted in FIG. 3. The MOV 400 is a metal oxide varistor whose voltage rating is selected to match the voltage ratings of the SCRs and to prevent transient currents from getting to the disconnect switch 300 (e.g., the MOV may be selected to block voltages of up to 600 V).

The meter power supply 100 is conventional. It includes a transformer T0 connected to 240 VAC lines L1 and L2, and a diode rectifier for outputting a DC voltage $V_{DC}$. The disconnect switch 300 is also conventional, and includes a switch coil "K" (the switch contacts are not shown). The disconnect switch is connected to the SCRs, MOV and lines L1 and L2 as shown in FIGS. 2 and 3.

The present invention primarily relates to the driver circuits 200A and 200B. These circuits are, in the presently preferred embodiment, essentially identical in construction and operation, except the first driver circuit 200A is employed to close the disconnect switch whereas the second driver circuit is employed to open, or trip, the disconnect switch. Moreover, the driver circuits 200A and 200B share a common ground with the power supply 100. The first driver circuit 200A is powered by the half-wave voltage from a first terminal "Y" of the secondary winding of power supply transformer T0. Similarly, the second driver circuit 200B is powered by the half-wave voltage from a second terminal "X" of the power supply's secondary winding.

The primary elements of the driver circuits 200A and 200B are: capacitors C1 and C2 (e.g., 47 μF at 16 V); isolation transformers T1 and T2; transistors Q1 and Q2 with anti-parallel diodes D1 and D2, respectively; and their respective secondary circuits. The secondary circuits comprise resistors R1, R3 and R2, R4; diodes D3 and D4; and capacitors C3 and C4. The secondary circuit for the first drive circuit 200A drives the gate G1 of SCR1, and the secondary circuit for the second drive circuit 200B drives the gate G2 of SCR2. The two SCRs are connected in anti-parallel at nodes 500 and 600, as shown. Finally, other resistors are employed as well, including R5, R6, R7, R8, R9, R10, and R11. The values of these resistors may be selected to appropriately set the voltage levels at the various circuit nodes.

Functionality

The meter power supply 100 that already exists in the solid state meter design is utilized to develop ground-referenced signals for driving the gates (G1, G2) of the control SCRS. The two 60 Hz ground-referenced signals are pulled from the full-wave rectifier to generate out of phase signals to drive the SCRs. The signals have both AC and DC content, and so capacitors C1 and C2 are used to decouple the DC portion of the rectified power supply signal.

Normally, transistors Q1 and Q2 are off and capacitors C1 and C2 are discharged through D1, D2, R10 and R11, such that none of the AC signal that is present at "X" or "Y" gets coupled to transformers T1 or T2. When it is desired to operate the disconnect switch, a control signal is sent to the CLOSE input, which will cause transistor Q1 to saturate. With Q1 "on", there is an AC path from "Y", through C1 to the primary of T1, and through Q1 and D1. This path allows voltage on T1 to couple the gate of SCR1, turning SCR1 on. Half-wave drive current is fed to the switch coil "K" until the "close" signal is removed. When it is removed, Q1 turns "off" and C1 discharges again through R10 and D1.

Similar operation is achieved on the "TRIP" side by sending the control signal to saturate Q2. In this case, the signal at "X" is properly phased such that SCR2 will get positive gate drive in synch with the AC line voltage in order to drive current in coil "K" to trip the switch.

The CLOSE and TRIP signals may be locally generated by a microprocessor (not shown) in the electronic meter, or may be generated by the utility company. For example, a situation in which a CLOSE signal would be generated locally is where the utility company instructs the meter to connect power at a certain time in the future, e.g., after the customer is expected to move in to his new residence.

While the present invention has been described and illustrated with reference to a specific, presently referred embodiment, those skilled in the art will recognize that modifications and variations may be made without departing from the principles of the invention as described above and set forth in the following claims.

Figure 4:
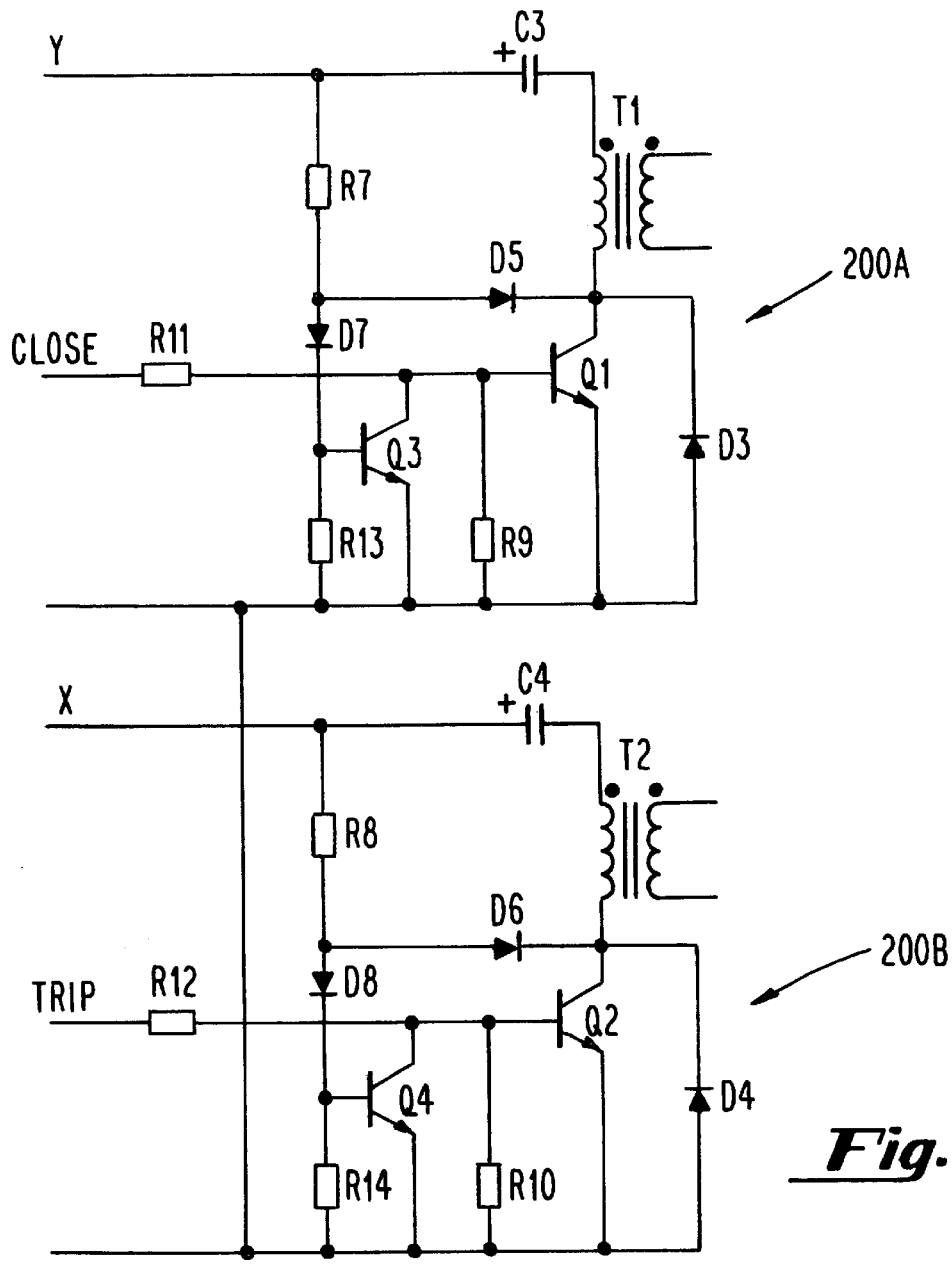
FIGS. 4 and 5 illustrate modifications to the preferred embodiments.
Figure 5:
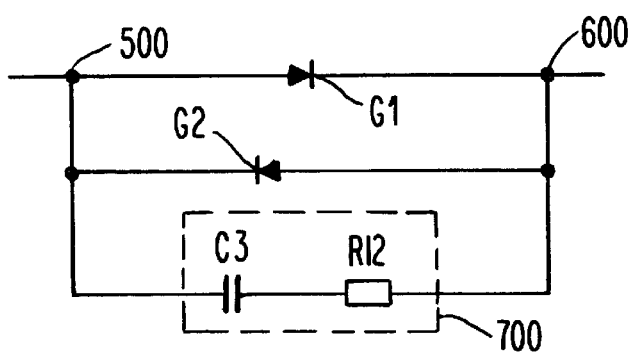

For example, FIGS. 4 and 5 depict possible modifications within the scope of the present invention.

1. The circuitry may be changed to allow coil drive only at zero crossover. As shown in FIG. 4, the "close" circuit 200A is modified such that, if the CLOSE signal is received at R11 while there is a positive "y" voltage present (non-zero crossover), Q3 will be driven on and Q1 will not be permitted to turn on, thus preventing gate drive via transformer T1. When the "y" voltage is low, Q3 will be off and Q1 will turn on. As the "y" voltage increases from zero, a gate drive signal will be applied to SCR1 (not shown in FIG. 4). Similar changes may also be made to the "trip" circuit 200B, as shown in FIG. 4.

2. As shown in FIG. 5, to meet some extreme levels of surge voltage, a "voltage snubber" circuit 700 (including, e.g., capacitor C3 and resistor R12) may be added across the SCRs. The snubber 700 is designed to reduce extreme rates of rise of voltage. Resistor R12 limits the discharge current from capacitor C3.

3. In addition, the value of resistor R5 may be changed in view of a change in the structure or manufacturer of the disconnect switch, even to total removal of the resistor.

Other features of the preferred embodiments described above may be modified without substantially departing from the teachings set forth herein.

I claim:

1. A circuit for driving a coil of a disconnect switch of a solid state meter, comprising:
   (A) first and second SCRs coupled to said coil for said disconnect switch such that said disconnect switch is closed when said first SCR is driven to an on state while said second SCR is off, and said disconnect switch is tripped when said second SCR is driven to an on state while said first SCR is off;
   (B) a first drive circuit operatively coupled to said first SCR; and
   (C) a second drive circuit operatively coupled to said second SCR;
       wherein said first and second drive circuits are powered with half-wave voltage derived from an AC line coupled to said meter.

2. A circuit as recited in claim 1, further comprising a power supply transformer coupled to said first and second drive circuits such that said circuits are powered by a secondary winding of said power supply transformer.

3. A circuit as recited in claim 2, wherein said first drive circuit comprises a first drive transformer having a primary winding operatively coupled to said secondary winding of the power supply transformer, and a secondary winding operatively coupled to said first SCR.

4. A circuit as recited in claim 3, wherein said first drive circuit further comprises a first transistor coupled to the primary winding of said first drive transformer, said transistor comprising a terminal for receiving a close signal to cause said first transistor to switch to a state that will cause said first SCR to turn on.

5. A circuit as recited in claim 3, wherein said first drive circuit further comprises a first capacitor coupled between said primary winding of said first drive transformer and said secondary winding of said power supply transformer.

6. A circuit as recited in claim 3, wherein said first drive circuit further comprises a first diode coupled in anti-parallel with said first drive transistor.

7. A circuit as recited in claim 2, wherein said first drive circuit comprises:
   a first drive transformer having a primary winding operatively coupled to said secondary winding of the power supply transformer, and a secondary winding operatively coupled to said first SCR;
   a first transistor coupled to the primary winding of said first drive transformer, said first transistor comprising a terminal for receiving a close signal to cause said first transistor to switch to a state that will cause said first SCR to turn on;
   a first capacitor coupled between said primary winding of said first drive transformer and said secondary winding of said power supply transformer; and
   a first diode coupled in anti-parallel with said first drive transistor.

8. A circuit as recited in claim 2, wherein said second drive circuit comprises a second drive transformer having a primary winding operatively coupled to said secondary winding of the power supply transformer, and a secondary winding operatively coupled to said second SCR.

9. A circuit as recited in claim 8, wherein said second drive circuit further comprises a second transistor coupled to the primary winding of said second drive transformer, said second transistor comprising a terminal for receiving a trip signal to cause said second transistor to switch to a state that will cause said second SCR to turn on.

10. A circuit as recited in claim 8, wherein said second drive circuit further comprises a second capacitor coupled between said primary winding of said second drive transformer and said secondary winding of said power supply transformer.

11. A circuit as recited in claim 9, wherein said second drive circuit further comprises a second diode coupled in anti-parallel with said second drive transistor.

12. A circuit as recited in claim 2, wherein said second drive circuit comprises:
   a second drive transformer having a primary winding operatively coupled to said secondary winding of the power supply transformer, and a secondary winding operatively coupled to said second SCR;
   a second transistor coupled to the primary winding of said second drive transformer, said second transistor comprising a terminal for receiving a trip signal to cause said second transistor to switch to a state that will cause said second SCR to turn on;
   a second capacitor coupled between said primary winding of said second drive transformer and said secondary winding of said power supply transformer; and
   a second diode coupled in anti-parallel with said second drive transistor.

13. A circuit as recited in claim 1, and further comprising a varistor operatively coupled between said AC line and said first and second SCRs.

14. A circuit as recited in claim 13, wherein said varistor is further operatively coupled to said disconnect switch so as to limit transient currents from entering said disconnect switch.

15. A half-wave drive circuit utilizing 60 Hz signals that pre-exist within a solid state meter to drive a disconnect switch coupled to an AC line, comprising:
   (A) first and second SCRs operatively coupled to said disconnect switch such that said disconnect switch is closed when said first SCR is driven to an on state while said second SCR is off, and said disconnect switch is tripped when said second SCR is driven to an on state while said first SCR is off;
   (B) a first drive circuit operatively coupled to said first SCR;
   (C) a second drive circuit operatively coupled to said second SCR; and
   (D) a power supply transformer coupled to said first and second drive circuits such that said circuits are powered by a secondary winding of said power supply transformer.

16. A circuit as recited in claim 15, wherein said first drive circuit comprises a first drive transformer having a primary winding operatively coupled to said secondary winding of the power supply transformer, and a secondary winding operatively coupled to said first SCR; and said second drive circuit comprises a second drive transformer having a primary winding operatively coupled to said secondary winding of the power supply transformer, and a secondary winding operatively coupled to said second SCR.

17. A circuit as recited in claim 16, wherein said first drive circuit further comprises a first transistor coupled to the primary winding of said first drive transformer, said first transistor comprising a terminal for receiving a close signal to cause said first transistor to switch to a state that will cause said first SCR to turn on; and said second drive circuit further comprises a second transistor coupled to the primary winding of said second drive transformer, said second transistor comprising a terminal for receiving a trip signal to cause said second transistor to switch to a state that will cause said second SCR to turn on.

18. A circuit as recited in claim 17, wherein said first drive circuit further comprises a first capacitor coupled between said primary winding of said first drive transformer and said secondary winding of said power supply transformer; and said second drive circuit further comprises a second capacitor coupled between said primary winding of said second drive transformer and said secondary winding of said power supply transformer.

19. A circuit as recited in claim 18, wherein said first drive circuit further comprises a first diode coupled in anti-parallel with said first drive transistor; and said second drive circuit further comprises a second diode coupled in anti-parallel with said second drive transistor.

20. A circuit as recited in claim 15, further comprising a varistor operatively coupled between said AC line and said first and second SCRs.

21. A circuit as recited in claim 20, wherein said varistor is further operatively coupled to said disconnect switch so as to limit transient currents from entering said disconnect switch.

22. A switch control system for use in an electronic meter for metering an AC line, comprising:
 (A) a power supply coupled to said AC line;
 (B) an electronically actuated switch coupled to said AC line; and
 (C) switch drive means coupled between said power supply and said switch for closing said switch in response to a close signal and opening said switch in response to a trip signal;
  wherein said switch drives means comprises electronic circuitry that is powered with signals that pre-exist within the solid state meter; and comprises only a single stage of isolation between said power supply and said switch; and prevents surges on said AC line from causing unwanted open or close operations.

23. A system as recited in claim 22, wherein said switch drive means comprises a first SCR and first drive circuit for driving said first SCR; and a second SCR and second drive circuit for driving said second SCR, said first and second SCRs being operatively coupled to said disconnect switch.

24. A system as recited in claim 23, said switch drive means further comprising a varistor operatively coupled between said AC line and said first and second SCRs.

25. A system as recited in claim 24, wherein said varistor is further operatively coupled to said disconnect switch so as to limit transient currents from entering said disconnect switch whereby surges on said AC line are prevented from causing unwanted open or close operations.

* * * * *